Nov. 19, 1940.  R. BURKHARDT  2,221,756
CLEANING RING FOR WHEELS
Original Filed Feb. 28, 1938
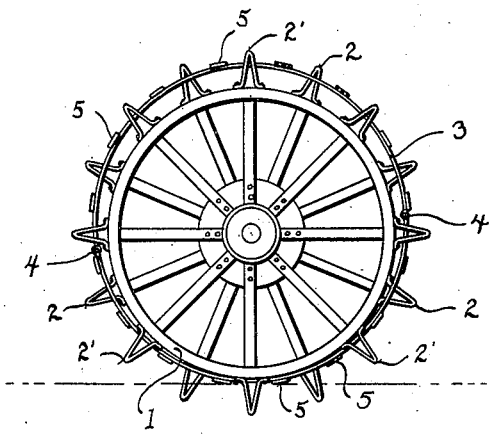
Fig.1.
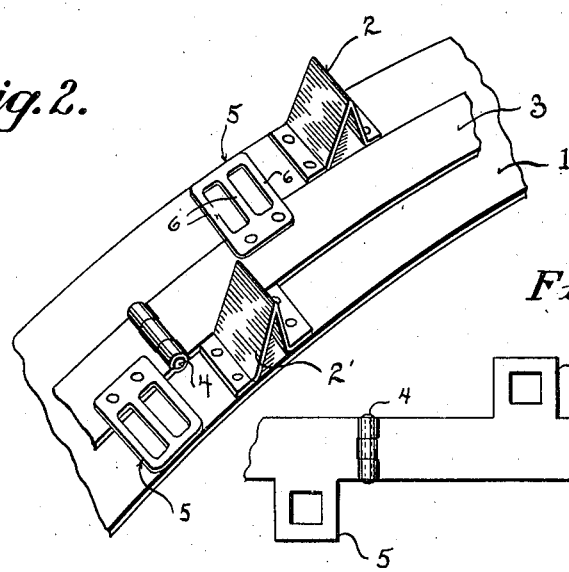
Fig.2.
Fig.4.
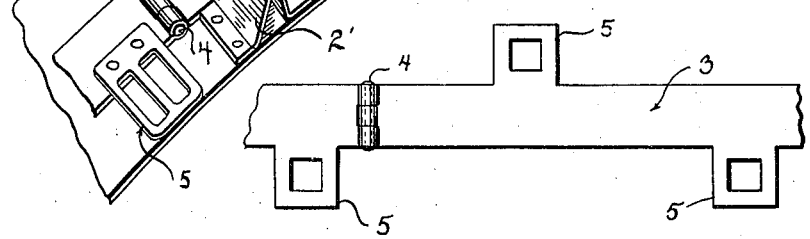
Fig.3.
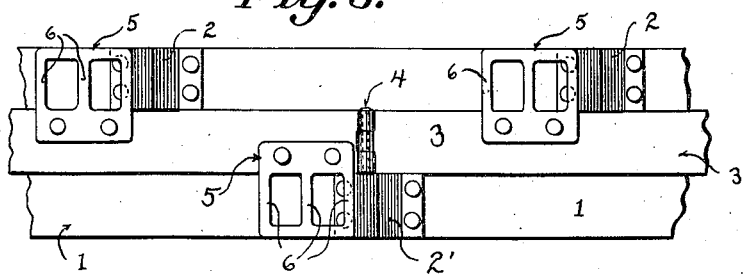
Inventor.
Richard Burkhardt
By
Attorneys.

Patented Nov. 19, 1940

2,221,756

UNITED STATES PATENT OFFICE 2,221,756

CLEANING RING FOR WHEELS

Richard Burkhardt, Elkhart Lake, Wis., assignor of one-half to Richard F. Maurer, Elkhart Lake, Wis.

Application February 28, 1938, Serial No. 192,985
Renewed April 3, 1940

1 Claim. (Cl. 301—41)

My invention refers to cleaning rings for tractor wheels, and it has for its primary object to provide a ring for the tractor wheel, embodying two or more parts attached for adjustment to a tractor wheel, or any lugged wheel, having lugs upon opposite edges of the rim, the ring being provided with lugs extending upon opposite edges for effectually stripping the mud or clay from the wheel rim and its lugs.

With the above and other minor objects my invention consists in certain peculiarities of construction and combination of parts as will be hereinafter fully set forth with reference to the accompanying drawing and subsequently claimed.

In the drawing:

Figure 1 represents a side elevation of a standard tractor wheel having two sets of lugs extending from said tread upon opposite edges thereof, the said tractor wheel being provided with a mud-stripping ring embodying my invention.

Figure 2 is a magnified perspective view of a fragment of the wheel rim fitted with a portion of a mud-stripping ring embodying my invention.

Figure 3 is a fragmentary plan view of the same; and

Figure 4 is a fragmentary view illustrating a modified form of the solid or skeleton ring.

Referring by numerals to the drawing, 1 indicates the rim of a tractor wheel having mounted thereon spaced series of lugs 2—2', there being a clear portion of the rim between the two sets of lugs, as best shown in Figure 2. Fitted upon the clear space of the wheel tread is a ring 3, which ring is of slightly greater diameter than the tread of the wheel, whereby, as best shown in Figure 1, the said ring, when engaging the ground, will be pressed snugly against the wheel tread, and owing to the diameter of this ring the upper portion thereof will be moved outwardly to a point close to the terminal of the wheel lugs. Thus it will be seen that as the wheel rotates there will be continuous sloshing of vibrating movement of the ring, whereby it will clear the tread of the wheel and lugs from any foreign matter, such as clay, stones, or the like.

The ring 3, as shown, is composed of two halves terminating with apertured lugs, which are in meshed alinement for the reception of locking pins 4. Thus the ring elements can be readily assembled upon the wheel tread between the two series of lugs, or may be removed from said wheel tread when the tractor wheel is not operating under clogging conditions.

The ring, as best shown in Figure 2, is of such width that it will snugly fit between the two series of wheel lugs, whereby said ring will move freely and be guided in its movement by the engaging edges of the lugs, to thus prevent unwarranted side wobbling of said ring.

The ring is provided, as best shown in Figure 2, with oppositely extended stripper fingers 5—5, which fingers may, as shown, be riveted, welded, or otherwise secured to the ring 3. The fingers, as shown, are oppositely disposed with relation to the ring, and are spaced radially approximately the same distance apart as the wheel lugs 2. Hence, when the ring is shifted about the wheel rim when functioning, the edges of these fingers will engage the wheel lugs, and will insure stripping of any chunks of mud that may adhere thereto.

Furthermore, it will be observed that the fingers are in skeleton form to provide what might be termed a series of tangs 6 with openings therebetween, whereby in the gyration of the loose ring these tangs form teeth or cutting surfaces for mutilating sticky mud which may adhere to the wheel rim.

As shown in Figure 3 of the drawing, the fingers are illustrated as abutting the inclined edges of the lugs 2, which position would be the normal working relation between the fingers and lugs.

Figure 4 of the drawing illustrates another form of lug in connection with the ring 3, in which case the lugs are illustrated as being integral with the ring elements.

From the foregoing description it will be observed that the mud-stripping ring described is simple in construction, and therefore can be manufactured at a minimum cost. Attention is further directed to the arrangement of oppositely disposed fingers associated with the wheel lugs, whereby all foreign elements, such as mud, clay, stones, or the like, will be gyrated and broken up to eliminate clogging of the wheel.

It should also be noted that the ring, being made in two or more portions locked together, can be readily assembled upon any standard wheel having two sets of lugs spaced apart. It is only necessary to match the two portions of the ring together and lock them in place with the pin elements, whereby the rings will be held in rigid formation with relation to the wheel, but are capable of rising and falling with each rotation of said wheel.

I claim:

The combination of a wheel having two series of spaced lugs positioned about the opposite edge faces of the wheel rim, of a single ring loosely fitted to the wheel rim of a width equal to the width between the lugs thereof, whereby the ring may guide and shift radially with relation to the wheel tread, and a series of skeleton fingers extending from both sides of the ring, each finger forming a plurality of mud-cutting bars, said fingers being so spaced with relation to the opposite edges of the ring that they will simultaneously engage one face of each of said wheel lugs.

RICHARD BURKHARDT.